United States Patent
Pulluru et al.

(10) Patent No.: US 11,688,269 B2
(45) Date of Patent: Jun. 27, 2023

(54) METHOD AND APPARATUS FOR DETECTING WHEN A SECURITY SYSTEM IS ARMED AND A MOBILE DEVICE IS LEFT INSIDE

(71) Applicant: Carrier Corporation, Palm Beach Gardens, FL (US)

(72) Inventors: Ramakrishna Pulluru, Telangana (IN); Arun Kumar Manthani, Telangana (IN); Balaji Ananthachari, Telangana (IN); Venkateswara Rao N R, Telangana (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 81 days.

(21) Appl. No.: 17/251,446

(22) PCT Filed: Nov. 8, 2019

(86) PCT No.: PCT/US2019/060376
§ 371 (c)(1),
(2) Date: Dec. 11, 2020

(87) PCT Pub. No.: WO2020/117424
PCT Pub. Date: Jun. 11, 2020

(65) Prior Publication Data
US 2021/0312786 A1    Oct. 7, 2021

(30) Foreign Application Priority Data
Dec. 6, 2018   (IN) .............................. 201811046105

(51) Int. Cl.
*G08B 21/00* (2006.01)
*G08B 21/24* (2006.01)
(Continued)

(52) U.S. Cl.
CPC ........... *G08B 21/24* (2013.01); *G08B 25/008* (2013.01); *G08B 25/10* (2013.01); *H04B 17/318* (2015.01); *H04W 4/023* (2013.01); *H04W 4/33* (2018.02)

(58) Field of Classification Search
CPC ...... G08B 21/24; G08B 25/008; G08B 25/10; G08B 21/0247; G08B 21/0277; H04B 17/318; H04W 4/023; H04W 4/33
(Continued)

(56) References Cited

U.S. PATENT DOCUMENTS 6,462,660 B1 * 10/2002 Cannon .............. G08B 21/0247
340/568.1
8,941,478 B2    1/2015 Mirle et al.
(Continued)

FOREIGN PATENT DOCUMENTS

CN    202918379 U    5/2013
CN    103729982 B    12/2015
(Continued)

OTHER PUBLICATIONS

International Search Report and Written Opinion for International Application No. PCT/US2019/060376; International Filing Date Nov. 8, 2019; Report dated Mar. 27, 2020 (pp. 1-14).

*Primary Examiner* — Mark S Rushing
(74) *Attorney, Agent, or Firm* — Cantor Colburn LLP (57) ABSTRACT

A method of detecting when a first mobile device is left in a building including: determining that an alarm system of a building has been armed; detecting positional data of a first mobile device for a selected period of time after the alarm system has been activated; determining a location of the first mobile device after the selected period of time in response to the positional data, the location of the first mobile device being within the building; and activating an alarm in
(Continued)

response to the location of the first mobile device being within the building.

17 Claims, 3 Drawing Sheets

(51) Int. Cl.
 H04B 17/318 (2015.01)
 H04W 4/33 (2018.01)
 G08B 25/00 (2006.01)
 G08B 25/10 (2006.01)
 H04W 4/02 (2018.01)

(58) Field of Classification Search
 USPC .......................................................... 340/8.1
 See application file for complete search history.

(56) References Cited

U.S. PATENT DOCUMENTS

| | | |
|---|---|---|
| 8,947,222 B2 | 2/2015 | Deluca |
| 9,251,693 B2 | 2/2016 | Edwards |
| 9,717,012 B2 | 7/2017 | Zakaria et al. |
| 10,083,595 B2 | 9/2018 | Rudolph |
| 2011/0175722 A1 | 7/2011 | Jensen et al. |
| 2012/0171956 A1 | 7/2012 | Lee |
| 2014/0176319 A1 | 6/2014 | Nadguada |
| 2014/0266699 A1* | 9/2014 | Poder .................. G08B 25/008 340/539.13 |
| 2016/0189527 A1 | 6/2016 | Peterson et al. |
| 2016/0217675 A1* | 7/2016 | Schroeder .............. H02J 50/90 |
| 2017/0048376 A1 | 2/2017 | Logan |
| 2017/0076583 A1* | 3/2017 | Hua ..................... G08B 25/008 |
| 2018/0070210 A1 | 3/2018 | Bruck et al. |
| 2018/0182231 A1 | 6/2018 | Miyajima et al. |

FOREIGN PATENT DOCUMENTS

| | | |
|---|---|---|
| CN | 207802392 U | 8/2018 |
| DE | 102012022318 A1 | 5/2014 |
| EP | 1513123 A2 | 3/2005 |

* cited by examiner

METHOD AND APPARATUS FOR DETECTING WHEN A SECURITY SYSTEM IS ARMED AND A MOBILE DEVICE IS LEFT INSIDE

CROSS REFERENCE TO RELATED APPLICATIONS

This application is a US National Stage of International Application No. PCT/US2019/060376 filed on Nov. 8, 2019, which claims the benefit of IN Application No.: 201811046105, filed on Dec. 6, 2018, which are incorporated herein by reference in its their entirety.

BACKGROUND

The subject matter disclosed herein generally relates to the field of alarm systems, and more particularly to an apparatus and method for operating alarm system.

Existing alarm systems allow an individual to arm the alarm system prior to leaving a building. However if the individual forgets their mobile device in the building they may be too far away from the building when the individual realizes they forgot their mobile device to turnaround and return to the building.

BRIEF SUMMARY

According to one embodiment, a method of detecting when a first mobile device is left in a building is provided. The method including: determining that an alarm system of a building has been armed; detecting positional data of a first mobile device for a selected period of time after the alarm system has been activated; determining a location of the first mobile device after the selected period of time in response to the positional data, the location of the first mobile device being within the building; and activating an alarm in response to the location of the first mobile device being within the building.

In addition to one or more of the features described above, or as an alternative, further embodiments may include that determining that an alarm system of a building has been activated further includes: receiving a first pin entered via a user input from a first individual, the first pin being associated with the first mobile device belonging to the first individual, wherein the first pin arms the alarm system.

In addition to one or more of the features described above, or as an alternative, further embodiments may include: preventing an alarm from being activated on a second mobile device belonging to a second individual, wherein a second pin is associated with the second mobile device, the second pin being different from the first pin.

In addition to one or more of the features described above, or as an alternative, further embodiments may include that the alarm is activated on the first mobile device.

In addition to one or more of the features described above, or as an alternative, further embodiments may include that the alarm is activated on the alarm system.

In addition to one or more of the features described above, or as an alternative, further embodiments may include that the alarm is activated on a building component.

In addition to one or more of the features described above, or as an alternative, further embodiments may include that the building component is a light.

In addition to one or more of the features described above, or as an alternative, further embodiments may include that detecting positional data of a first mobile device for a selected period of time after the alarm system has been activated further includes: detecting received signal strength indicators of wireless signals between the first mobile device and the alarm system; and determining a distance between the first mobile device and the alarm system in response to the received signal strength indicators of wireless signals between the first mobile device and the alarm system.

In addition to one or more of the features described above, or as an alternative, further embodiments may include that detecting positional data of a first mobile device for a selected period of time after the alarm system has been activated further includes: detecting received signal strength indicators of wireless signals between the first mobile device and a wireless access protocol device; and determining a distance between the first mobile device and the wireless access protocol device in response to the received signal strength indicators of wireless signals between the first mobile device and the wireless access protocol device.

According to another embodiment, an alert system for detecting when a first mobile device is left in a building is provided. The alert system including: a processor; and a memory including computer-executable instructions that, when executed by the processor, cause the processor to perform operations, the operations including: determining that an alarm system of a building has been armed; detecting positional data of a first mobile device for a selected period of time after the alarm system has been activated; determining a location of the first mobile device after the selected period of time in response to the positional data, the location of the first mobile device being within the building; and activating an alarm in response to the location of the first mobile device being within the building.

In addition to one or more of the features described above, or as an alternative, further embodiments may include that determining that an alarm system of a building has been activated further includes: receiving a first pin entered via a user input from a first individual, the first pin being associated with the first mobile device belonging to the first individual, wherein the first pin arms the alarm system.

In addition to one or more of the features described above, or as an alternative, further embodiments may include that the operations further include: preventing an alarm from being activated on a second mobile device belonging to a second individual, wherein a second pin is associated with the second mobile device, the second pin being different from the first pin.

In addition to one or more of the features described above, or as an alternative, further embodiments may include that the alarm is activated on the first mobile device.

In addition to one or more of the features described above, or as an alternative, further embodiments may include that the alarm is activated on the alarm system.

In addition to one or more of the features described above, or as an alternative, further embodiments may include that the alarm is activated on a building component.

In addition to one or more of the features described above, or as an alternative, further embodiments may include that the building component is a light.

In addition to one or more of the features described above, or as an alternative, further embodiments may include that detecting positional data of a first mobile device for a selected period of time after the alarm system has been activated further includes: detecting received signal strength indicators of wireless signals between the first mobile device and the alarm system; and determining a distance between the first mobile device and the alarm system in response to the received signal strength indicators of wireless signals between the first mobile device and the alarm system.

In addition to one or more of the features described above, or as an alternative, further embodiments may include that detecting positional data of a first mobile device for a selected period of time after the alarm system has been activated further includes: detecting received signal strength indicators of wireless signals between the first mobile device and a wireless access protocol device; and determining a distance between the first mobile device and the wireless access protocol device in response to the received signal strength indicators of wireless signals between the first mobile device and the wireless access protocol device.

According to another embodiment, a computer program product tangibly embodied on a computer readable medium is provided. The computer program product including instructions that, when executed by a processor, cause the processor to perform operations including: determining that an alarm system of a building has been armed; detecting positional data of a first mobile device for a selected period of time after the alarm system has been activated; determining a location of the first mobile device after the selected period of time in response to the positional data, the location of the first mobile device being within the building; and activating an alarm in response to the location of the first mobile device being within the building.

Technical effects of embodiments of the present disclosure include detecting arming of an alarm system and activating an alarm if an individual, who armed the alarm system, will leave the building without their mobile device.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
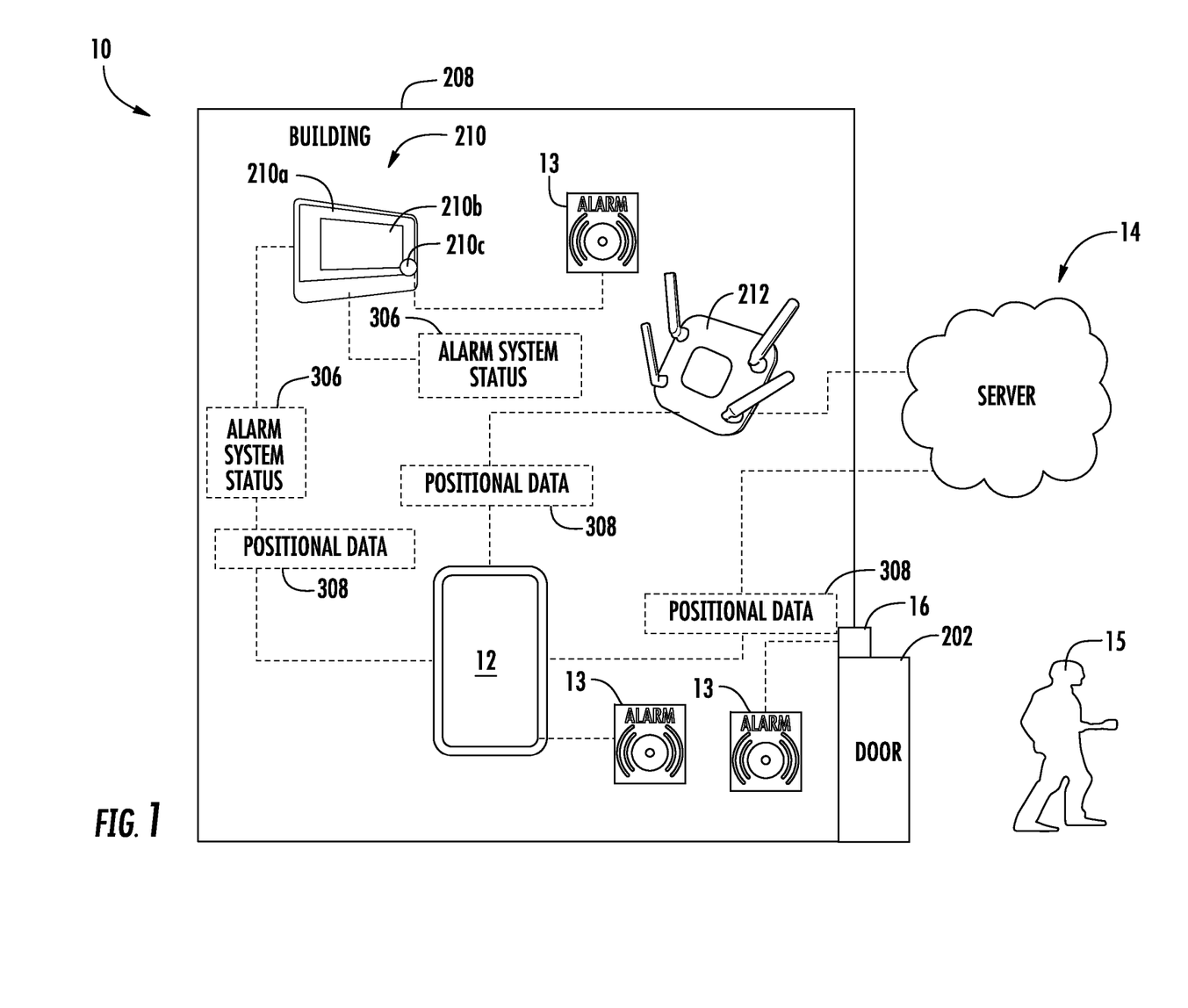
FIG. 1 illustrates a general schematic system diagram of an alert system, in accordance with an embodiment of the disclosure.

FIG. 1 schematically illustrates an alert system 10. The alert system 10 generally includes a mobile device 12, a server 14, a wireless access protocol device 212, an alarm system 210, and a building component 16. It should be appreciated that, although particular systems are separately defined in the schematic block diagrams, each or any of the systems may be otherwise combined or separated via hardware and/or software. It should be appreciated that while one building component 16 is illustrated, the alert system 10 may include any number of building components 16. The alarm system 210 may include an alarm system panel 210a, a display screen 210b, a speaker 210c, and a plurality of sensors (non-shown for clarity) including but not limited to door sensors, window sensors, and/or motion sensors. The alarm system 210 is configured to secure the building 208 and may activate an alarm 13 if doors 202 or windows (not shown) of the building 208 are breached or motion is detected. The motion may be inside or outside of the building 208.

The mobile device 12 is a wireless capable portable computing device that is operable to communicate with the server 14, wireless access protocol device 212, and the alarm system 210. The mobile device 12 may be a wireless capable portable computing device, such as, for example, a smartphone, a smart watch, a tablet computer, a laptop computer, or similar device known to one of skill in the art.

Although the server 14 is depicted herein as a single device, it should be appreciated that the server 14 may alternatively be embodied as a multiplicity of systems. The server 14 is in electronic communication with the mobile device 12 and alarm system 210. The sever 14 may be a cloud computing network in a non-limiting embodiment. The server 14 may be an electronic controller including a processor and an associated memory comprising computer-executable instructions that, when executed by the processor, cause the processor to perform various operations. The processor may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be but is not limited to a random access memory (RAM), read only memory (ROM), or other electronic, optical, magnetic or any other computer readable medium.

The alarm system 210 is configured to transmit an alarm system status 306 of the alarm system 210. For example, the alarm system status 306 of the alarm system 210 may indicate whether the alarm system 210 has been activated or deactivated. For example, the alarm system 210 may be activated by an individual 15 prior to leaving the building 208. The individual 15 may activate the alarm system 210 via selection input through an input device. The input device may the display screen 210b if the display screen 210b is a touch screen. The input device may also be a separate key pad or microphone configured to receive a pin entered or spoken via user input. An individual 15 may utilized an individual pin to activate the alarm system 210 through the selection input. For example, a first individual may utilize a first pin to activate the alarm system 210, whereas a second individual may utilize a second pin different from the first pin to activate the alarm system 210. The first pin is associated with a first mobile device belonging to first individual and the second pin is associated with a second mobile device belonging to the second individual. Advantageously, by utilized individual pins for each individual, the alarm system 210 may identify which individual armed the alarm system 210 and identify the mobile device 12 belonging to that individual in order to remind that individual (e.g., through an alarm 13) when they have left their mobile device 12 in the building 208 after activating the alarm system 210. Once activated, the alarm system 210 is configured to secure the building 208 and may activate an alarm 13 if doors 202 or windows (not shown) of the building 208 are breached or motion is detected. The motion may be inside or outside of the building 208. The alarm system 210 may transmit the alarm system status 306 to the server 14 and/or the mobile device 12. The alarm system status 306 may be transmitted to the server 14 through the wireless access protocol device 212 or the mobile device 12. The alarm system status 306 may be transmitted via a wireless signal, such as, for example Wi-Fi or Bluetooth.

In a non-limiting embodiment, the server 14 is configured to receive the alarm system status 306 and monitor positional data 308 of the mobile device 12 in response to the alarm system status 306. Alternatively, the mobile device and/or the alarm system 210 may also configured to receive the alarm system status 306 and monitor positional data 308 of the mobile device 12 in response to the alarm system status 306. For example, if the alarm system status 306 shows that the alarm system 210 has been armed then the server 14 will monitor positional data 308 of the mobile device 12. The server 14 may monitor the positional data 308 of the mobile device for a selected time period after the alarm system status 306 has been received indicating that the alarm system 210 has been armed. The positional data 308 of the mobile device 12 may be monitored at a selected frequency (e.g., every 2 seconds). The Positional data 308 of the mobile device 12 may include a location of the mobile device 12. The location of the mobile device 12 may be relative to a wireless access protocol device 212 or the alarm system 210. The positional data 308 may also include a derivative of the location of the mobile device 12 that is indicative of movement by the mobile device 12. Movement may also be detected by an inertial measurement unite (IMU) sensor 57, as described below.

Positional data 308 of the mobile device may be determined using a GPS receiver 48 and/or receive signal strength indicators (RSSI) of wireless signals between the mobile device 12 and the alarm system 210 or between the mobile device 12 and the wireless access protocol device 212. The distance between the mobile device 12 and the alarm system 210 may be determined utilizing RSSI and then the location of the mobile device 12 may be determined using a known location of the alarm system 210. The distance between the mobile device 12 and the wireless access protocol device 212 may be determined utilizing RSSI and then the location of the mobile device 12 may be determined using a known location of the wireless access protocol device 212. The wireless signals may be Bluetooth and/or Wi-Fi.

In a non-limiting embodiment, the server 14 may be configured to determine that the mobile device 12 is being left in the building 208 after arming the alarm system 210 in response to the alarm system status 306 and the positional data 308. Alternatively, the mobile device and/or the alarm system 210 may also be configured to determine that the mobile device 12 is being left in the building 208 after arming the alarm system 210 in response to the alarm system status 306 and the positional data 308.

Once it is determined that the mobile device 12 is being left in the building 208 after arming the alarm system 210 in response to the alarm system status 306 and the positional data 308, then the mobile device 12, alarm system 210, and/or building component 16 may activate an alarm 13 to capture the attention of the individual 15. The alarm 13 may be audible, vibratory, and/or visual. For example, if it is determined that an individual 15 left their mobile device 12 in the building 208 after having armed the alarm system 210, the mobile device 12 may start flashing and/or the mobile device 12 may produce an audible sound (e.g. beep) after the selected time period. In another example, if it is determined that an individual 15 left their mobile device 12 in the building 208 after having armed the alarm system 210, a smart wearable (e.g. smart watch) being worn by the individual 15 and wirelessly connected to the mobile device 12 may start flashing, vibrating, and/or the smart wearable may produce an audible sound (e.g. beep) after the selected time period. In yet another example, if it is determined that an individual 15 left their mobile device 12 in the building 208 after having armed the alarm system 210, then an alarm 13 may be activated on the alarm system 210. The alarm 13 on the alarm system 210 may be audible and/or visual. For example, a display screen 210b of the alarm panel 210a may start flashing and/or the alarm system 210 may produce an audible sound (e.g. beep) from the speaker 210 after the selected period of time.

Additionally, if it is determined that an individual 15 left their mobile device 12 in the building 208 after having armed the alarm system 210, then a building component 16 may be notified that the mobile device 12 was left in the building 208 and an alarm 13 may also be activated on the building component 16. For example, the building component 16 may be a light or include a light and then the light may start flashing after the selected time period. Further the building component 16 may be located proximate the door 202 of the building 208, so that it may capture the attention of the individual 15 as they leave the building 208. The building component 16 also may produce an audible sound (e.g. beep) after the selected period of time.

The building component 16 may be wirelessly connected to at least one of the wireless access protocol device 212, the mobile device 12, the server 14, and the fire alarm system 210. In a non-limiting embodiment, communication between the mobile device 12 and the building component 16 may occur through the server 14. The communication between the server 14 and the mobile device 12 may occur through the wireless access protocol device 212 or another wireless network such as, for example, a cellular network. In another non-limiting embodiment, communication between the fire alarm system 210 and the building component 16 may occur through the server 14. For example, the mobile device 12 may communicate wirelessly through the wireless access protocol device 212 to the server 14 and then the server 14 may relay the communication wirelessly to the building component 16. In another example, the alarm system 210 may communicate wirelessly through the wireless access protocol device 212 to the server 14 and then the server 14 may relay the communication wirelessly to the building component 16. The building component 16 may communicate via short range wireless communication, such as for example Wi-Fi, Bluetooth, ZigBee, infrared, or any other short-range wireless communication method known to one of skill in the art.

Figure 2:
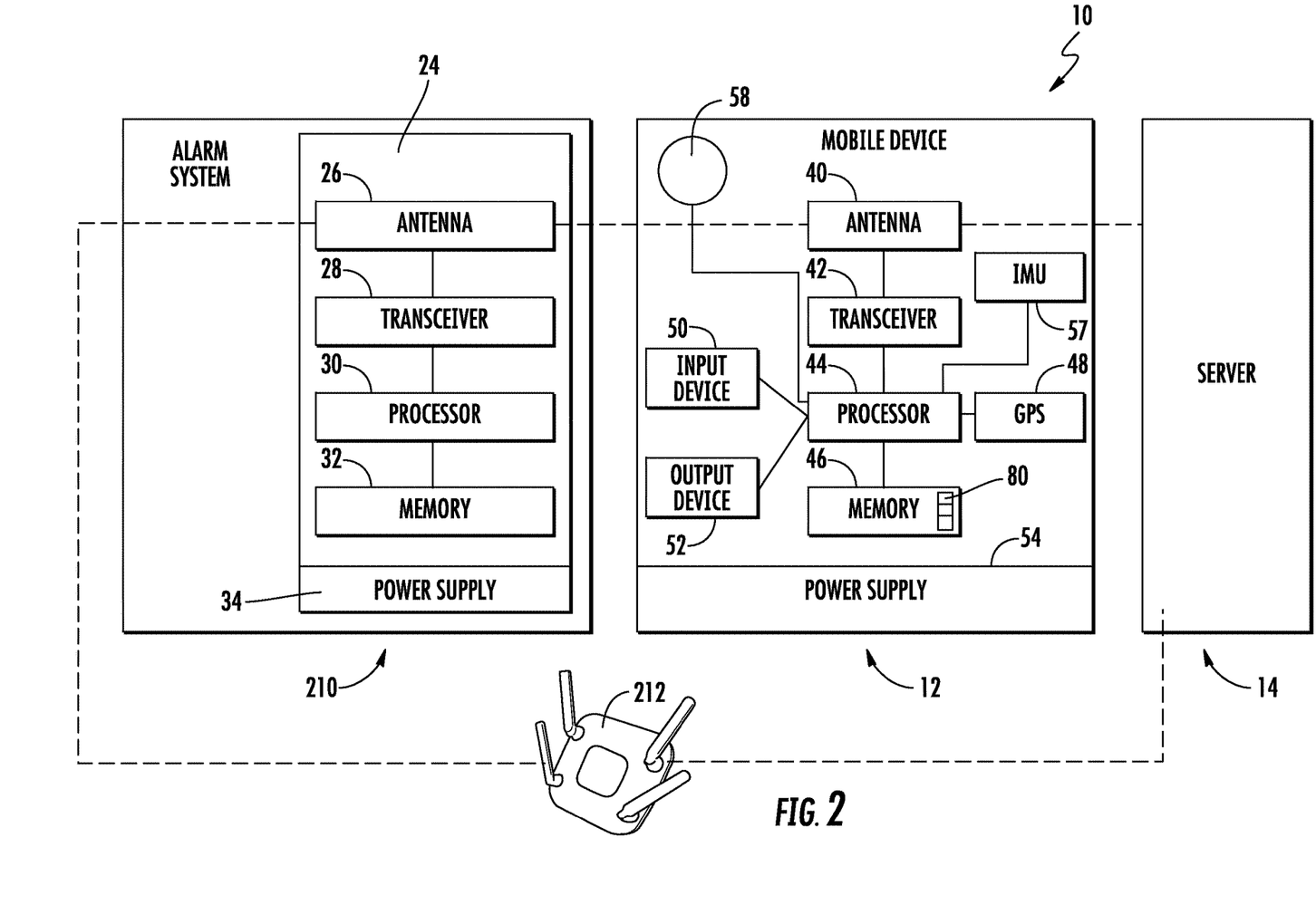
FIG. 2 illustrates a block diagram of the alert system of FIG. 1, in accordance with an embodiment of the disclosure.

Referring now to FIG. 2 with continued reference to FIG. 1. FIG. 2 shows a block diagram of an example of alert system 10 that includes the alarm system 210, the mobile device 12, the wireless access protocol device 212, and the server 14. The alarm system 210 generally includes a controller 24, an antenna 26, a transceiver 28, a processor 30, a memory 32, and a power supply 34.

The transceiver 28 is capable of transmitting and receiving data to and from at least one of the mobile device 12 and the wireless access protocol device 212. The transceiver of the alarm system 210 may communicate with the server 14 through the wireless access protocol device 212 and/or the mobile device 12. The transceiver 28 may, for instance, be a near field communication (NFC), Bluetooth, infrared, ZigBee, or Wi-Fi transceiver, or another appropriate wireless transceiver. The antenna 26 is any antenna appropriate to the transceiver 28. The processor 30 and memory 32 are, respectively, data processing, and storage devices. The memory 32 may be RAM, EEPROM, or other storage medium where the processor 30 can read and write data including but not limited to configuration options.

The power supply 34 is a power source such as line power connection, a power scavenging system, and/or a battery system that powers the controller 24.

The mobile device 12 generally includes an antenna 40, a transceiver 42, a processor 44, a memory 46, a GPS receiver 48, an input device 50, an output device 52, a power supply 54, and an inertial measurement unit (IMU) sensor 57. The transceiver 42 is a transceiver of a type corresponding to the transceiver 28, and the antenna 40 is a corresponding antenna. In some embodiments, the transceiver 42 and the antenna 40 may also be used to communicate with the server 14. In other embodiments, one or more separate transceivers and antennas may be included to communicate with server 14. The memory 46 may be RAM, EEPROM, or other storage medium where the processor 30 can read and write data including but not limited to configuration options. The mobile device 12 may also include a mobile device application 80. Embodiments disclosed herein, may operate through the mobile device application 80 installed on the mobile device 12. The mobile device 12 may also include an alarm device 58 configured to generate an audible, vibratory, and/or visual alarm 13 (e.g., see FIG. 1). For example, the alarm device 58 may be a vibratory mechanism configured to vibrate when the alarm 13 is activated. In another example, the alarm device 58 may be a speaker configured to emit an audible alert when the alarm 13 is activate. In another example, the alarm device 58 may be a display screen or light of the mobile device 58 configured to flash or strobe when the alarm 13 is activated. The IMU sensor 57 may be a sensor such as, for example, an accelerometer, a gyroscope, or a similar sensor known to one of skill in the art.

The positional data 308 may be detected using one or more methods and apparatus. The positional data 308 may be determined by the mobile device 12, alarm system 21, and/or the server 14. The positional data 308 may be communicated to each of the alarm system 210, mobile device 12, and/or server 12 once determined. The positional data 308 may include a location of the mobile device 12 and/or a movement of mobile device 12 that is a derivative of a location of the mobile device, such as, for example, velocity, acceleration, jerk, jounce, snap . . . etc. The mobile device 12 can determine by the GPS 48, by the IMU sensor 57, received signal strength indicators of wireless signals or by triangulating signals from the alarm system 210 and/or wireless access protocol device(s) 212. The mobile device 12 may do calculations based on the received signal strength, as discussed above. The positional data 308 may be crude (i.e. close to the wireless access protocol device 212) or it may be very accurate (i.e. very precise) depending on the method used.

If the mobile device 12 determines the positional data 308 then the mobile device 12 may initiate an alarm 13 on the mobile device 12 itself and then initiate other alarms 13 by sending a message to the server 14, the wireless access protocol device 212, the alarm system 210, or the building component 16, which could then activate alarms 13. The server 14 can determine positional data 308 by receiving signals from the wireless access protocol device(s) 212 of signals sent from the mobile device 12 (e.g., Wi-Fi). The server 14 could activate the alarm 13 by sending a message to the mobile device 12, the wireless access protocol device 212, the alarm system 210, or the building component 16, which could then activate alarms 13. The alarm system 210 can also determine positional data 308 by receiving signals from the wireless access protocol device(s) 212 of signals sent from the mobile device 12 (e.g., Wi-Fi) or signals sent directly to the alarm system 210 from the mobile device 12 (e.g., Bluetooth or Wi-Fi). The alarm system 210 could activate the alarm 13 by sending a message to the mobile device 12, the wireless access protocol device 212, the server 14, or the building component 16, which could then activate alarms 13.

The location of the mobile device 12 may also be detected through triangulation of wireless signals emitted from the mobile device 12 or signal strength between the mobile device 12 and the wireless access protocol device 212. The location of the mobile device 12 may be detected using any other desired and known location detection/position reference means.

Figure 3:
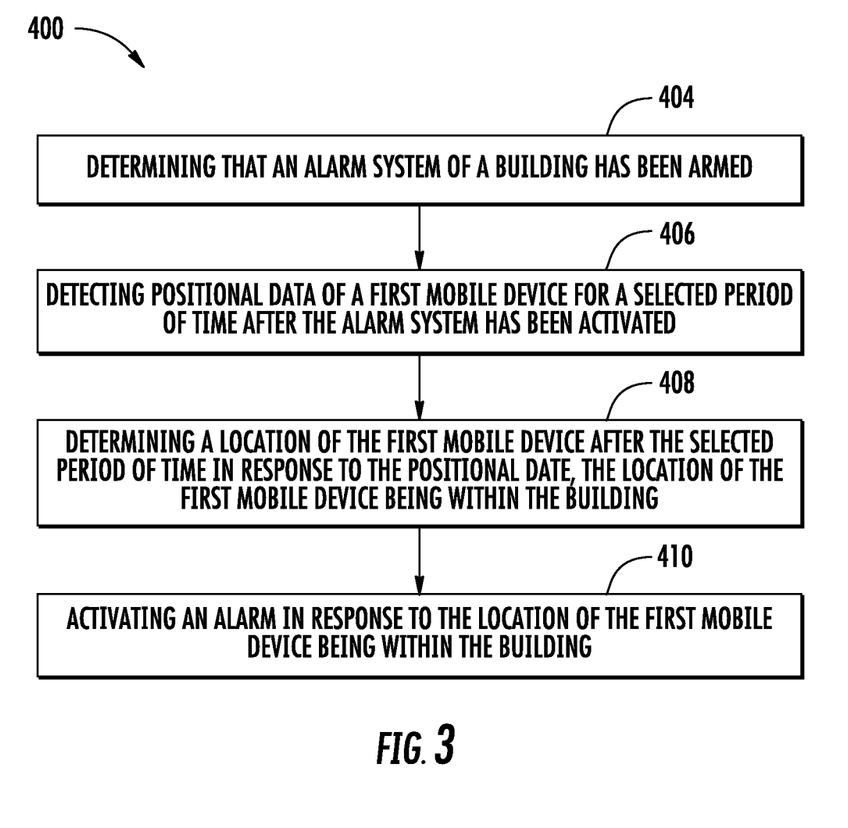
FIG. 3 is a flow diagram illustrating a method of detecting when a mobile device is left in a building, according to an embodiment of the present disclosure.

Referring now to FIG. 3, with continued reference to FIGS. 1-2, a flow chart of a method 400 of detecting when a mobile device 12 is left in a building 208 is illustrated, in accordance with an embodiment of the disclosure. The method 400 may be performed by the mobile device 12, the alarm system 210, and/or the server 14.

At block 404, it is determined that an alarm system 210 of a building 208 has been armed. It may be determined that an alarm system 210 of the building 208 has been activated by: receiving a first pin entered via a user input from a first individual. The first pin is associated with the first mobile device belonging to the first individual. The first pin arms the alarm system 210. An alarm 13 may only be activated on the first mobile device and thus then the method prevents an alarm 13 from being activated on a second mobile device belonging to a second individual. A second pin is associated with the second mobile device and the second pin is different from the first pin.

At block 406, positional data 308 of a first mobile device is detected for a selected period of time after the alarm system 210 has been activated. Positional data 308 of a first mobile device may be detected for a selected period of time after the alarm system 210 has been activated by: detecting received signal strength indicators of wireless signals between the first mobile device and the alarm system 210; and determining a distance between the first mobile device and the alarm system 210 in response to the received signal strength indicators of wireless signals between the first mobile device and the alarm system 210. Additionally, positional data 308 of a first mobile device may be detected for a selected period of time after the alarm system 210 has been activated by: detecting received signal strength indicators of wireless signals between the first mobile device and a wireless access protocol device; and determining a distance between the first mobile device and the wireless access protocol device 212 in response to the received signal strength indicators of wireless signals between the first mobile device and the wireless access protocol device 212.

At block 408, a location of the first mobile device is determined after the selected period of time in response to the positional data 308. The location of the first mobile device is determined to be within the building within the building 208.

At block 410 an alarm 13 is activated in response to the location of the first mobile device being within the building 208. The alarm 13 may be activated on at least one of the first mobile device, the alarm system 210, and the building component 16. In an embodiment, the alarm 13 is activated on the first mobile device. In another embodiment, the alarm 13 is activated on the alarm system 210. In another embodiment, the alarm 13 is activated on the building component 16.

While the above description has described the flow process of FIG. 3 in a particular order, it should be appreciated that unless otherwise specifically required in the attached claims that the ordering of the steps may be varied.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of detecting when a first mobile device is left in a building, the method comprising:
   determining that an alarm system of a building has been armed;
   detecting positional data of a first mobile device for a selected period of time after the alarm system has been activated;
   determining a location of the first mobile device after the selected period of time in response to the positional data, the location of the first mobile device being within the building; and
   activating an alarm in response to the location of the first mobile device being within the building;
   wherein determining that an alarm system of a building has been activated further comprises:
   receiving a first pin entered via a user input from a first individual, the first pin being associated with the first mobile device belonging to the first individual,
   wherein the first pin arms the alarm system.

2. Method of claim 1, further comprising:
   preventing an alarm from being activated on a second mobile device belonging to a second individual, wherein a second pin is associated with the second mobile device, the second pin being different from the first pin.

3. The method of claim 1, wherein the alarm is activated on the first mobile device.

4. The method of claim 1, wherein the alarm is activated on the alarm system.

5. The method of claim 1, wherein the alarm is activated on a building component.

6. The method of claim 5, wherein the building component is a light.

7. The method of claim 1, wherein detecting positional data of a first mobile device for a selected period of time after the alarm system has been activated further comprises:
   detecting received signal strength indicators of wireless signals between the first mobile device and the alarm system; and
   determining a distance between the first mobile device and the alarm system in response to the received signal strength indicators of wireless signals between the first mobile device and the alarm system.

8. The method of claim 1, wherein detecting positional data of a first mobile device for a selected period of time after the alarm system has been activated further comprises:
   detecting received signal strength indicators of wireless signals between the first mobile device and a wireless access protocol device; and
   determining a distance between the first mobile device and the wireless access protocol device in response to the received signal strength indicators of wireless signals between the first mobile device and the wireless access protocol device.

9. An alert system for detecting when a first mobile device is left in a building, the alert system comprising:
   a processor; and
   a memory comprising computer-executable instructions that, when executed by the processor, cause the processor to perform operations, the operations comprising:
   determining that an alarm system of a building has been armed;
   detecting positional data of a first mobile device for a selected period of time after the alarm system has been activated;

determining a location of the first mobile device after the selected period of time in response to the positional data, the location of the first mobile device being within the building; and activating an alarm in response to the location of the first mobile device being within the building;

wherein determining that an alarm system of a building has been activated further comprises:

receiving a first pin entered via a user input from a first individual, the first pin being associated with the first mobile device belonging to the first individual, wherein the first pin arms the alarm system.

10. The alert system of claim 9, wherein the operations further comprise:

preventing an alarm from being activated on a second mobile device belonging to a second individual, wherein a second pin is associated with the second mobile device, the second pin being different from the first pin.

11. The alert system of claim 9, wherein the alarm is activated on the first mobile device.

12. The alert system of claim 9, wherein the alarm is activated on the alarm system.

13. The alert system of claim 9, wherein the alarm is activated on a building component.

14. The alert system of claim 13, wherein the building component is a light.

15. The alert system of claim 9, wherein detecting positional data of a first mobile device for a selected period of time after the alarm system has been activated further comprises:

detecting received signal strength indicators of wireless signals between the first mobile device and the alarm system; and determining a distance between the first mobile device and the alarm system in response to the received signal strength indicators of wireless signals between the first mobile device and the alarm system.

16. The alert system of claim 9, wherein detecting positional data of a first mobile device for a selected period of time after the alarm system has been activated further comprises:

detecting received signal strength indicators of wireless signals between the first mobile device and a wireless access protocol device; and determining a distance between the first mobile device and the wireless access protocol device in response to the received signal strength indicators of wireless signals between the first mobile device and the wireless access protocol device.

17. A computer program product tangibly embodied on a computer readable medium, the computer program product including instructions that, when executed by a processor, cause the processor to perform operations comprising:

determining that an alarm system of a building has been armed;

detecting positional data of a first mobile device for a selected period of time after the alarm system has been activated;

determining a location of the first mobile device after the selected period of time in response to the positional data, the location of the first mobile device being within the building; and activating an alarm in response to the location of the first mobile device being within the building;

wherein determining that an alarm system of a building has been activated further comprises:

receiving a first pin entered via a user input from a first individual, the first pin being associated with the first mobile device belonging to the first individual, wherein the first pin arms the alarm system.

* * * * *